Dec. 11, 1928.

A. M. FLYNT 1,694,439

SPARE TIRE CARRIER

Filed Sept. 30, 1927

Witness
I. R. Pierce

Inventor
A. M. Flynt.
By H. B. Willson & Co.
Attorneys

Patented Dec. 11, 1928.

1,694,439

UNITED STATES PATENT OFFICE.

AUGUSTUS M. FLYNT, OF SAVANNAH, GEORGIA.

SPARE-TIRE CARRIER.

Application filed September 30, 1927. Serial No. 223,007.

While most automobiles are provided with a carrier for supporting only one spare tire, it is very often desirable to carry two spares, and it is the principal object of my invention to provide a new and improved device whereby the second spare tire is supported by one end of a rigid sigmoidal strap, whose other end is hooked over the tire on the conventional carrier.

A further object is to provide the above-named strap with a hooked extremity to hook over the rearmost rim flange of the rim upon which the second spare tire is mounted, effectively holding this second tire and its carrying rim against displacement with respect to the strap.

The hooked extremity just referred to, prevents disengagement of the second spare tire from the strap until this strap is disengaged from the first spare tire. Hence, it is a further aim of my invention to provide means for locking the strap upon the first spare tire so that the second spare cannot be stolen without first releasing the locking means.

With the foregoing in view, the invention resides in the novel subject matter hereinafter described and claimed, the description being supplemented by the accompanying drawing.

Figure 1:
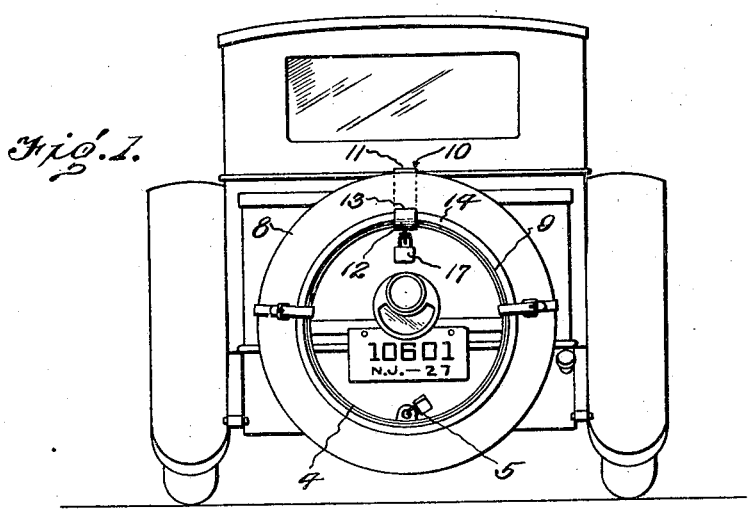
Fig. 1 is a rear elevation of an automobile equipped with the invention.
Figure 2:
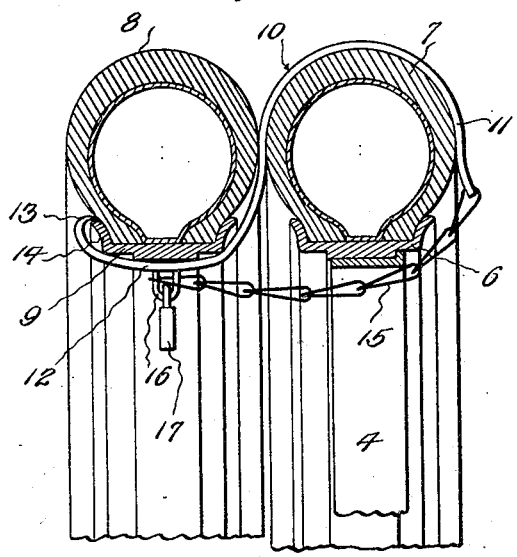
Fig. 2 is an enlarged vertical section showing the sigmoidal carrier in operative relation with the first and second spare tires.

In the drawing above briefly described, the numeral 4 denotes a conventional spare tire carrier and 5 has reference to means for locking the rim 6 of a spare tire 7 upon said carrier. 8 denotes a second spare tire on a rim 9, supported behind the tire 7 by a carrier 10, constituting the present invention.

Figure 3:
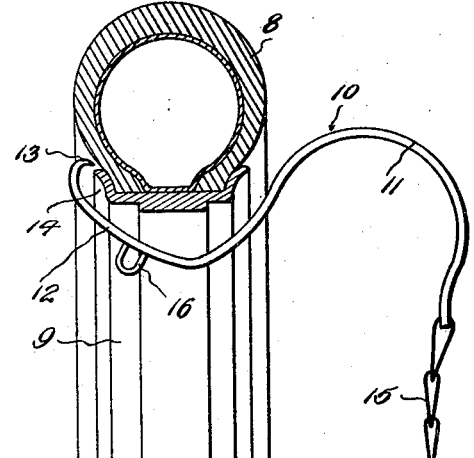
Fig. 3 is a sectional view illustrating the manner of removing the sigmoidel carrier from the second spare tire after said carrier has been disengaged from the first spare.

The carrier 10 is in the form of a rigid, sigmoidal, metal strap, one end 11 of said strap being adapted to hook over the spare tire 7, while the other end 12 of said strap is adapted to hook under the rim 9 of the second spare tire 8. This end 12 terminates in a thinned, inwardly curved hook 13 which is adapted to hook over the rearmost flange 14 of the rim 9. This hook prevents upward movement of the tire 8 and its rim 9 from engagement with the carrier 10 and I provide means for locking this carrier upon the tire 7. Thus, without first releasing the locking means and disengaging the carrier 10 from the tire 7, said carrier cannot be removed from the rim 9. Consequently, the tire 8 and its rim 9 cannot be merely lifted from the carrier 10 and hence danger of theft is overcome. When the locking means is released and the carrier 10 is disengaged from the tire 7, said carrier may be readily swung out of engagement with the rim 9, as shown in Fig. 3.

The locking means above referred to, preferably consists of a chain 15 connected to the end 11 of the carrier 10, and engageable with a loop 16 on the carrier end 12, together with a padlock 17 for engagement with said loop.

Excellent results are obtainable from the details disclosed and they are therefore preferably followed. However, within the scope of the invention as claimed, variations may be made. Moreover, it will be understood that while I have described the invention only for carrying a second spare tire and supporting its weight upon the first spare, additional spares could be mounted by the use of additional carriers 10, the weight of each tire being carried by the tire immediately in front thereof.

I claim:—

1. The combination with a spare tire carrier and a rim-carried spare tire thereon, of a sigmoidal strap having one end hooked over said spare tire and its other end projecting rearwardly therefrom, a second rim-carried spare tire behind the first named tire, the rearwardly projecting end of said strap being hooked under the rim of said second spare tire, an inwardly turned hook on the extremity of said projecting end of the strap and engaged with the rearmost flange of the rim of said second spare tire to prevent disengagement of the rim of said second spare tire from the strap until the latter is unhooked from the first named spare tire, and common means for locking said strap on the first named spare tire and for locking the latter and its rim to said carrier.

2. The combination with a spare tire carrier of annular form and a rim-carried spare tire thereon; of a sigmoidal strap having one end hooked over said spare tire and its other end projecting rearwardly therefrom, a second rim-carried spare tire behind the first named tire, the rearwardly projecting end of said strap being hooked under the rim of said second spare tire, an inwardly turned hook on the extremity of said projecting end of the strap and engaged with the rearmost flange of the rim of said second spare tire to prevent disengagement of the rim of said second spare tire from the strap until the latter is unhooked from the first named spare tire, a loop on the rearwardly projecting end of said strap, a chain secured at its inner end to the forward end of the strap, said chain passing beneath the rim of said first named spare tire and the upper portion of the carrier and having its free end engaged with said loop and means for locking said end of the chain in engagement with the loop.

In testimony whereof I have hereunto affixed my signature.

AUGUSTUS M. FLYNT.